United States Patent Office 3,110,709
Patented Nov. 12, 1963

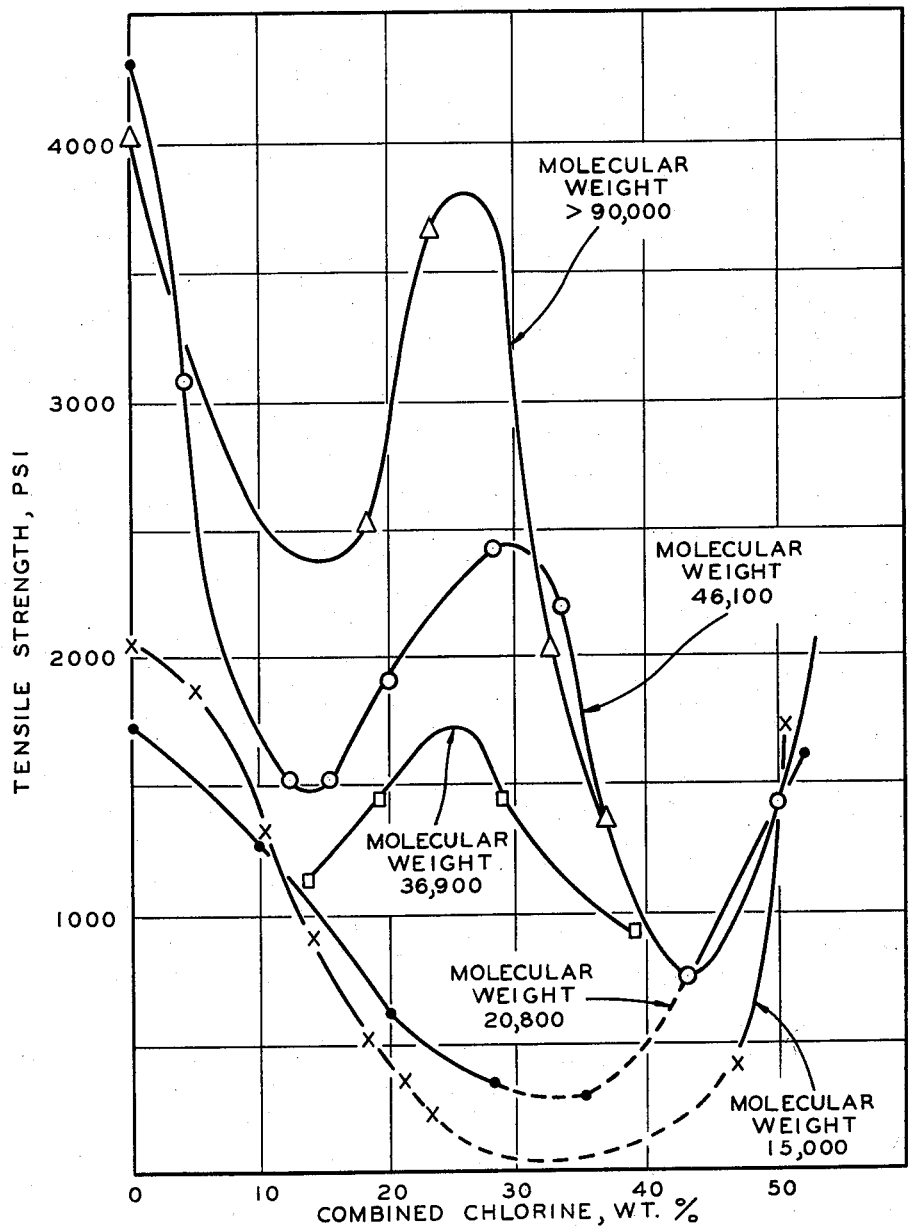

3,110,709
CHLORINATED POLYETHYLENE
Peter J. Canterino, Bartlesville, Okla., assignor to Phillips Petroleum Company, a corporation of Delaware
Filed Sept. 9, 1955, Ser. No. 533,433
11 Claims. (Cl. 260—94.9)

This invention relates to a novel chlorinated polyethylene. In one aspect, the invention relates to a process for producing a chlorinated polyethylene having unexpected and desirable properties.

The production of solid polymers of ethylene is known. It is also known to chlorinate such polymers. The chlorinated polymers range in properties from rubbery to brittle. The rubbery polymers can be molded to form shaped articles such as bottles and other containers. They can be extruded to form tubing or filaments. They can be formed into films useful for wrapping foods, coating surfaces for protection thereof, and for electrically insulating wires and other articles.

I have found that the chlorination of polyethylenes having certain specific properties, to obtain chemically combined chlorine contents within a specific range, results in chlorinated polyethylenes of unexpectedly advantageous properties.

An object of this invention is to produce improved chlorinated polyethylenes. Another object of the invention is to produce chlorinated polyethylenes having high tensile strength. Another object is to produce chlorinated polyethylenes having low flex temperatures. Other objects and advantages will be apparent, to those skilled in the art, from the subsequent disclosure.

According to this invention, there is provided a chlorinated polyethylene containing from about 17 to about 33 weight percent chemically combined chlorine, said chlorinated polyethylene being produced from a polyethylene having a molecular weight of at least 30,000 and preferably from 30,000 to 200,000. The molecular weight referred to herein is defined as 24,450 times the inherent viscosity determined for a solution of 0.2 gram of the polyethylene in 50 cc. of tetralin at 130° C. See Kemp and Peters, Ind. Eng. Chem. 35, 1108 (1943) and Dienes and Klemm, J. App. Phys. 17, 458–471 (June 1946).

The polyethylene used as a starting material according to this invention is preferably one having a density of at least 0.94 grams per cubic centimeter at 20° C. and a crystallinity of at least 80 percent. More preferably the density at 20° C. is at least 0.95 grams per cubic centimeter and the crystallinity is at least 90 percent. Although my invention is not limited by any theory, it is believed that the specified high density and crystallinity of the polyethylene used as a starting material indicate a preponderantly straight-chain structure in the polymer, with a low degree of branching.

Suitable polyethylenes for use according to this invention can be produced by the method set forth in the copending application of Hogan and Banks, Serial No. 476,306, filed December 20, 1954 (see U.S. Patent 2,825,721, 1958). A suitable, and often preferred, polyethylene can thus be prepared by contacting ethylene, at a temperature from about 150 to about 450° F., with a catalyst comprising chromium oxide, including a substantial amount of hexavalent chromium, associated with at least one other oxide, usually selected from the group consisting of silica, alumina, zirconia, and thoria. The polymerization is frequently conducted with the ethylene in admixture with a hydrocarbon which can be maintained liquid and is inert under the polymerization conditions. Suitable hydrocarbons are paraffins and cycloparaffins, e.g., n-heptane, 2,2,4-trimethylpentane, cyclohexane, and methylcyclohexane. A continuous slurry-type reaction technique is preferred, the catalyst being in powdered form (e.g. 40–100 mesh) and suspended in the hydrocarbon solvent. A pressure sufficient to maintain the solvent in the liquid phase is preferably used, e.g., 200–700 p.s.i. With a suspended catalyst, a preferred polymerization temperature range is 200 to 325° F.

Another type of polyethylene suitable as a starting material can be obtained according to the processes disclosed in Ziegler's Belgian Patent 533,362 (November 16, 1954).

Another type of polyethylene suitable as a starting material according to this invention is prepared by polymerization in the presence of a fluid catalyst which is a mixture of (1) a metal-organic compound of the type of aluminum alkyls or aryls, e.g. triethyl aluminum, or an alkyl aluminum halide such as the ethyl aluminum chlorides and (2) a metal compound such as titanium tetrachloride, titanium tetrabutoxide, molybdenum pentachloride, iridium trichloride and others. The polymerization is conducted at temperatures usually in the range 100 to 400° F. and pressures sufficient to maintain the solvent hydrocarbon, e.g. cyclohexane, 2,2,4-trimethylpentane, benzene, or toluene, substantially in the liquid phase. Processes of this type are more fully described in copending applications Serial No. 494,281, filed March 14, 1955, by J. A. Reid; Serial No. 521,367, filed July 11, 1955 by Nowlin, Lyons and Edmonds; Serial No. 520,164, filed July 5, 1955, by Nowlin and Lyons; Serial No. 515,232, filed June 13, 1955, by Nowlin and Lyons; and Serial No. 495,054, filed March 17, 1955, by Nowlin and Lyons.

A preferred method of chlorination is that set forth in the copending application Serial No. 442,891, filed July 12, 1954, now U.S. Patent 3,060,164 (1962), by P. J. Canterino. Generally, this involves dissolving the polyethylene in a volatile solvent such as carbon tetrachloride at a temperature above the normal boiling point of the solvent and a superatmospheric pressure sufficient to maintain the solvent substantially in the liquid phase, e.g. 80–120° C. and 5–100 p.s.i.g. A chlorination agent is then added. Usually elemental chlorine is passed through the solution until a partially chlorinated product, usually containing about 15 weight percent combined chlorine is obtained. This intermediate product is soluble in carbon tetrachloride at atmospheric pressure and temperatures up to the boiling point of carbon tetrachloride. The temperature and the pressure are then lowered, e.g. to 50–70° C. and atmospheric pressure, and the chlorination is continued to the desired extent. The solvent can be removed by volatilization and the chlorinated polymer recovered as a residue. Or an antisolvent can be added to precipitate the chlorinated polymer which can be recovered by filtration.

Another suitable chlorination method is described in copending application Serial No. 446,666, filed July 29, 1954, by Canterino and Baptist, now U.S. Patent 2,920,064 (1960). This involves conducting the initial chlorination (up to at least about 15 weight percent combined chlorine) with the polyethylene in solution in a solvent such as 1,1,2,2-tetrachloroethane, and any further chlorination desired can be conducted with carbon tetrachloride or a similar compound as the solvent.

In each of the foregoing methods, the entire chlorination can be conducted in a single stage utilizing tetrachloroethane as the solvent or carbon tetrachloride at superatmospheric pressure and a temperature above the normal boiling point of carbon tetrachloride.

The drawing is a plot of chemically combined chlorine content against tensile strength of chlorinated polymer for products obtained by chlorinating five different polyethylenes having different molecular weights. The polyethylene having a molecular weight of 20,800 was a commerical polyethylene produced by high-pressure polymerization (of the order of 10,000 p.s.i.) in the presence of oxygen or an organic peroxide type catalyst. The other polyethylenes were produced by polymerization in the presence of chromium oxide-silica-alumina catalysts according to the cited application of Hogan and Banks. Details of the polymerization are given in the subsequent examples. It will be noted that unexpectedly high tensile strength values appear in the curves for the polyethylenes having molecular weights above 30,000 in the critical range of about 17 to about 33 weight percent combined chlorine, but no such values appear in the other curves. A preferred range of chlorine content is from about 20 to about 30 weight percent, since maximum tensile strengths appear in this range.

The chlorinated polymers of this invention can be cold-drawn to form threads or filaments of increased tensile strength. These filaments can be woven to form fabrics which are more fire-resistant than fabrics made from the unchlorinated polymers. They can be formed into rope which is weather-resistant. The chlorinated polymers can also be extruded to form electrical insulation (e.g. so-called "spaghetti"). The chlorinated polymers can be dissolved in solvents and applied to metal or other surfaces to form protective coatings.

EXAMPLE I

Ethylene was polymerized in a continuous process using a 20-gallon reactor provided with a stirrer. Polymerization was effected in the presence of a chromium oxide-silica-alumina catalyst (about 2 wt. percent Cr as oxide deposited on steam-aged 90 wt. percent $SiO_2$–10 wt. percent $Al_2O_3$ coprecipitated gel. Activated by heating for about 5 hr. in anhydrous air stream at 950° F. Ground to 20–100 mesh) using isooctane (2,2,4-trimethylpentane) as the solvent. The ethylene feed rate varied from 5.1 to 6.6 pounds per hour and the isooctane feed rate varied from 40 to 60 pounds per hour. Polymer concentration in the reactor ranged from 6.2 to 7 weight percent and catalyst concentration ranged from 0.46 to 0.6 weight percent. The catalyst was maintained in suspension in the reaction mixture. The temperature was 267–269° F. and the pressure was 420 p.s.i.g. The product had the following properties:

Table I

| | |
|---|---|
| Molecular weight | 46,100 |
| Density at 25° C., gm. per cc | 0.959 |
| Melting point, °F | 246±3 |
| Ash, percent | 0.07 |
| Crystallinity, percent | >90 |

The ethylene polymer was chlorinated in eleven different runs to give products having different chlorine contents. A portion of the original polymer was reserved as a control. The following table shows amounts of reactants used:

Table II

| Run No. | Ethylene Polymer Used, Grams | Tetrachloroethane Used, Liters | Chlorine Added, Grams [1] |
|---|---|---|---|
| 1 | 200 | 3.5 | 20 |
| 2 | 200 | 3.5 | 40 |
| 3 | 200 | 3.5 | 50 |
| 4 | 200 | 3.5 | 100 |
| 5 | 200 | 3.5 | 200 |
| 6 | 200 | 3.5 | 300 |
| 7 | 200 | 3.5 | 250 |
| 8 | 200 | 3.5 | 350 |
| 9 | 200 | 3.5 | 300 |
| 10 | 200 | 3.5 | 450 |
| 11 | [2] 300 | 3.5 | [2] 200 |

[1] This represents the total amount of chlorine charged, but it did not all react with the polyethylene.
[2] Different chlorination procedure as hereinafter described.

In each run, except run 11, the ethylene polymer was dissolved in tetrachloroethane at 115° C., air was removed by flushing the reactor with chlorine, and chlorine was introduced at the rate of approximately 60–80 grams per hour while the mixture was stirred. The reaction was effected in the presence of ultraviolet light. After the chlorine had been introduced and reacted, the reaction mixture was cooled to 60° C. under a chlorine atmosphere and then poured into twice its volume of isopropyl alcohol to precipitate the chlorinated polymer. The product was filtered, washed twice with isopropyl alcohol, and dried in a vacuum oven at 60° C. for 16 hours.

The products from runs 8 and 10 contained some tetrachloroethane. They were redissolved in carbon tetrachloride, the solutions were poured into isopropyl alcohol to precipitate the chlorinated polymers, and the solid products were filtered, washed and dried as before.

In run 11, chlorination was effected in two steps. In the first step, the materials used are as shown in the preceding table, and chlorination was continued until the product contained about 15 weight percent combined chlorine. For the second step, 180 grams of product from the first step was dissolved in 3.5 liters of carbon tetrachloride at 60° C. and 200 grams more chlorine was then introduced. The reaction was effected in the presence of ultraviolet light. The product was recovered by pouring the reaction mixture into isopropyl alcohol, filtering and washing it, and drying it in a vacuum oven at 60° C. for 16 hours.

Properties of the several chlorinated products are shown in the following table.

Table III

| Run No. | Combined Chlorine, Wt. Percent | Zero Strength, °F.[1] | Flex Temp., °F. | Impact Strength [2] | Tensile Strength, p.s.i.[4] | Elongation, Percent | Cold Drawn to (Percent Original Length) [5] | Tensile Strength, Oriented Samples, p.s.i.[6] |
|---|---|---|---|---|---|---|---|---|
| Control | 0 | 282 | +58 | 2.55 | 4,337 | 25 | 250 | 38,900 |
| 1 | 4 | 254 | +31 | 1.32 | 3,090 | 42 | 500 | 20,300 |
| 2 | 8.0 | 254 | −5 | 1.63 | 2,313 | 137 | 800 | 25,500 |
| 3 | 12.1 | 230 | −17 | 9.71 | 1,506 | 386 | 300 | 16,433 |
| 4 | 15.3 | 216 | −22 | 10.45 [3] | 1,530 | 615 | 600 | 11,600 |
| 5 | 20.0 | 203 | −33 | rubbery | 1,870 | 913 | 800 | 17,650 |
| 6 | 28.5 | 153 | −37 | do | 2,415 | 1,220 | 1,240 | 9,250 |
| 7 | 33.5 | 160 | −25 | do | 2,180 | 1,186 | 1,125 | 5,823 |
| 8 | 35.0 | 141 | −16 | do | 1,102 | 1,020 | 1,000 | 4,490 |
| 9 | 40.0 | 140 | −20 | do | 1,370 | 1,102 | 1,180 | 1,665 |
| 10 | 43.1 | 111 | −8 | do | 765 | 870 | 850 | 1,375 |
| 11 | 50.0 | 146 | +47 | do | 1,427 | 413 | (7) | (7) |

[1] Temperature at which the material has substantially no strength.
[2] Ft. lbs./in. ASTM D 256-47 T, cantilever beam test (Izod type).
[3] Did not fully rupture.
[4] Samples drawn at the rate of 20 inches per minute.
[5] Samples cold drawn (room temperature) at the rate of 2 inches per minute. Drawing stopped short of the breaking point (maximum elongation) and tensile strength determined on the oriented materials.
[6] Samples drawn at the rate of 12 inches per minute.
[7] Did not orient; 100 percent retraction.

Ethylene was polymerized over a fixed bed of chromium oxide-silica-alumina catalyst (similar to that previously described, but not ground) at a temperature of 320° F. and a pressure of 400 p.s.i.g., space velocity (volumes liquid/volume reactor/hour) of 6, and a feed containing 2.0 weight percent ethylene in isooctane. The ethylene feed rate was 1.3 pounds/hour and the isooctane flow rate was 11 gallons/hour. The polyethylene obtained had a density of 0.951, softening point of 248° F., tensile strength of 2000–2100 p.s.i., and a molecular weight of 15,000.

The polyethylene was dissolved in tetrachloroethane and chlorine was introduced in the presence of ultraviolet light using a temperature of 100–110° C. The reaction proceeded very rapidly. A series of runs was made to prepare products having chlorine contents of 18, 23, 36, and 47 weight percent. Upon completion of each reaction, the material was poured into isopropyl alcohol, washed several times with isopropyl alcohol, and dried in a vacuum oven at 50° C. from 24–48 hours.

A sample of commercial polyethylene designated as Alathon-1 (Du Pont polyethylene, molecular weight 20,800) was chlorinated in a series of runs using the method described above. Products were obtained having chlorine contents of 10, 20, 28, and 35 weight percent.

The flex temperature, tensile strength, and elongation were determined on each sample with the tensile specimens being drawn at the rate of 20 inches per minute. Test specimens of each material were then cold drawn at the rate of 2 inches per minute and tensile strength was determined on the oriented samples with the rate of pull set at 12 inches per minute. Results of these tests are shown below:

Table IV

| Run Number | Chlorine, Wt. Percent | Flex Temp., ° F. | Tensile Strength, p.s.i. | Elongation, Percent | Cold Drawn to (Percent Original Length) | Tensile Strength, Oriented Sample, p.s.i. |
|---|---|---|---|---|---|---|
| Polyethylene, mol. wt. 15,000: | | | | | | |
| 1 | 18 | −33 | 529 | 100 | 90 | (2) |
| 2 | 23 | −50 | 235 | 150 | 803 | 1,500 |
| 3 | 36 | −30 | 1 103 | 1 >1,300 | 1,320 | 334 |
| 4 | 47 | +14 | 441 | 800 | 1,215 | 1,730 |
| Commercial Polyethylene, mol. wt. 20,800: | | | | | | |
| 1 | 10 | −48 | 1,297 | 627 | 600 | 8,166 |
| 2 | 20 | −38 | 648 | 660 | 727 | 3,460 |
| 3 | 28 | −42 | 391 | 945 | 727 | 1,390 |
| 4 | 35 | −30 | 300 | 1,230 | 1,320 | 1,176 |

1 These samples had greater elongation than the capacity of the Instron tester and did not break.
2 Did not orient; sample broke.

The data show that chlorinated products prepared from the 46,100 molecular weight polyethylene have low flex temperatures when the chlorine content is in the desired range of 17–33 weight per cent and they have higher tensile strength and higher elongation than chlorinated polyethylenes prepared from the lower molecular weight polymers. A comparison of the oriented samples (cold drawn specimens) reveals that chlorinated products prepared from the high molecular weight polyethylene have a much higher tensile strength than products prepared from the lower molecular weight polymers. The change in tensile strength with increasing chlorine content is shown in the drawing.

EXAMPLE II

Two different polyethylenes were prepared as follows:

Ethylene was polymerized in a continuous process utilizing a 20 gallon reactor provided with a mechanical stirrer. Polymerization was effected in the presence of a chromium oxide-silica-alumina catalyst containing 0.258 weight percent chromium. Cyclohexane was employed as solvent in which the catalyst, which had a particle size ranging from 50 to 70 mesh, was suspended. A mixture of ethylene and cyclohexane was continuously passed through the reactor. The feed rates were: 4.28 pounds of ethylene, 2.5 pounds cyclohexane, and 0.127 pound catalyst per hour. Concentrations in the reactor were: 8.49 weight percent polymer, 0.57 weight percent catalyst and 7.28 weight percent ethylene. The reaction temperature was 285° F. and the reaction pressure 420 p.s.i.g. The catalyst was prepared by impregnating a 90 weight percent silica–10 weight percent alumina coprecipitated gel, as described in Example I, with an aqueous solution of chromium trioxide, drying the solid composite, and activating the composite by heating for about 5 hours in a current of substantially anhydrous air at 950° F. The silica-alumina composite had been previously steam aged as described in the cited application of Hogan and Banks. The reactor effluent was diluted with additional cyclohexane and freed of catalyst by filtration at about 325° F. The catalyst-free filtrate was subjected to evaporation conditions to remove the cyclohexane, and the polyethylene was recovered as a residue. This polyethylene is herein designated as Sample A.

A second batch of polyethylene was prepared by charging, to a 1400-ml. reactor having a mechanical stirrer, 1.2 pounds cyclohexane and 1.6 grams of 50–70 mesh chromium oxide-silica-alumina catalyst prepared as previously described but containing 2.5 weight percent chromium. The reactor was kept pressured to 450 p.s.i.g. with ethylene. The reaction temperature was maintained at 220° F. Three batch runs were made. The time and charging rate (grams of polymer produced per hour per gram of catalyst) are shown in the following tabulation.

| Run Number | Time, Hours | Rate |
|---|---|---|
| 1 | 3 | 21.2 |
| 2 | 5 | 20.4 |
| 3 | 5 | 11.7 |
| Average | | 17.8 |

The polymer from all three of the above runs was combined and designated Sample B.

Properties of Samples A and B are shown in Table V.

Table V

| Sample | A | B |
|---|---|---|
| Volatiles (wt. percent) | 0.15 | |
| Ash (wt. percent) | 0.91 | |
| Melting point (° F.) | 252±2 | |
| Softening point (° F.) | | 266 |
| Density, 20° C. | 0.963 | |
| Melt index | 1.531 | |
| Tensile (compression molded sample) | | 4008 |
| Elongation | | 60 |
| Impact (Falling ball, in.) | >72 | |
| Molecular weight | 36,900 | >90,000 |
| Crystallinity, percent | >90 | >90 |

The above-described polyethylenes were chlorinated by the following procedures:

Sample A was chlorinated by dissolving 40 grams of the polyethylene in 700 cc. of 1,1,2,2-tetrachloroethane at 110–115° C. The solution was placed in a reactor, and the reactor was flushed with chlorine. A stream of chlorine was then introduced while the reactor contents were irradiated with ultra-violet light through a window in the reactor wall. The temperature was maintained at 110 to 115° C. during the chlorination, and the reaction mixture was agitated. At the end of the reaction period, the reaction mixture was poured into from 2 to 3 times its volume of isopropyl alcohol, which acted as an antisolvent to precipitate the polymer. The solvent was then decanted, and the residue was washed twice with isopropyl alcohol. The residue was then dried in a vacuum oven for 16 hours at 50° C. and for 4 additional hours at 70° C. Four different portions of polyethylene Sample A were thus chlorinated to obtain chlorinated polyethylenes having different chlorine contents. Chlorine addition rates are indicated in Table VI for each of the four portions chlorinated.

*Table VI*

| Polyethylene Used | Chlorine Added, Grams | Time of Addition of Chlorine, Minutes |
|---|---|---|
| A | 25 | 30 |
| A | 40 | 40 |
| A | 60 | 60 |
| A | 80 | 90 |

Three separate portions of polyethylene Sample B were chlorinated by substantially the same procedure as that described in connection with the chlorination of Sample A, except for differences in quantities of materials used. In these runs the amount of tetrachloroethane used was 700 cc. The polyethylene was dissolved in the tetrachloroethane at 120° C. and the temperature was maintained at about 120° C. during the chlorination. The chlorinated product was recovered as described in connection with the chlorination of Sample A and was dried in a vacuum oven at 70° C. for 16 hours. Run data are given in Table VII.

*Table VII*

| Polyethylene Used | | Chlorine Added, Grams | Time of Addition of Chlorine, Min. |
|---|---|---|---|
| Run Number | Grams | | |
| B | 30 | 30 | 30 |
| B | 20 | 35 | 30 |
| B | 19 | 45 | 45–60 |

An additional chlorination run was made by further chlorination of the product of the first run described in Table VII above. A 20-gram portion of the chlorinated product, containing 18 weight percent combined chlorine, was dissolved in 700 cc. of carbon tetrachloride at a temperature in the range 65 to 70° C. and 4 grams of chlorine was introduced in the presence of ultraviolet light over a period of 10 minutes. The product was recovered by pouring the reaction mixture into isopropyl alcohol as previously described, washing, and drying in a vacuum oven at 60° C. for 16 hours.

Tensile strengths and elongations on the 8 chlorinated polyethylenes produced as described hereinabove were determined. The results are shown in Table VIII.

*Table VIII*

| Polyethylene Used | Chlorine, Wt. percent | Tensile, p.s.i. | Elongation at Break, percent |
|---|---|---|---|
| A | 13.7 | 1,130 | 467 |
| A | 19.5 | 1,422 | 877 |
| A | 29.7 | 1,383 | >1,050 |
| A | 38.8 | 930 | >1,050 |
| B | 18 | 2,513 | 693 |
| B | 22.4 | 3,685 | 855 |
| B | 32.0 | 2,050 | 850 |
| B | 36.6 | 1,383 | 953 |

The above data on tensile strength and chlorine content are plotted, with corresponding data from Example I, in the accompanying drawing. The drawing shows that for molecular weights above 30,000 and for chlorine contents in the range 17 to 33, the tensile strength rises sharply to a maximum. No such maximum is shown in the case of the chlorinated polymer prepared from the polyethylenes having molecular weights below 30,000. The existence of the tensile strength maxima is unexpected.

EXAMPLE III

Several chlorinated polyethylene samples were tested as anchoring agents in the production of laminated sheets of cellulose and polyethylene. The cellulose sheets were of the type designated by the trade name Cellophane, and the polyethylene film was fabricated from polyethylene having a molecular weight of approximately 20,000 and produced by the high pressure thermal process of the prior art. The chlorinated polyethylene anchoring agents were dissolved in toluene and the solution was applied to the Cellophane at an approximate rate of 2 pounds per ream. The polyethylene film was then sealed to the coated surfaces at 310 to 330° F. and 5000 p.s.i. The results of the tests are shown in Table IX.

*Table IX*

| Combined Chlorine in Anchoring Agent, wt. percent | Approximate Molecular Weight of Anchoring Agent Before Chlorination | Anchoring Quality |
|---|---|---|
| 31.9 | 15,000 | Fair. |
| 29.4 | 40,000 | Good Plus. |
| 33.0 | 40,000 | Good. |
| 39.0 | 40,000 | Fair. |

The foregoing data show that the chlorinated polyethylenes according to this invention, namely those having molecular weights of 40,000 before chlorination and chlorine contents of 29.4 and 33.0 weight percent, were superior to the other anchoring agents tested. The anchoring agents of this invention provided clear transparent coatings which were non-tacky and could be wound up in a roll form after application to the Cellophane.

The unchlorinated polyethylenes from which the chlorinated polymers tested were prepared and produced in the same general manner as disclosed in the preceding examples, except the polyethylene having a molecular weight of 15,000, which polyethylene was prepared by utilizing a fixed bed of chromium oxide-silica-alumina catalyst and a reaction temperature of about 350° F., the preparation procedure being otherwise similar to those previously disclosed. The polymers were chlorinated in the same general manner as described in the preceding examples.

This example illustrates the further utility of chlorinated polyethylene according to this invention as anchoring agents in the production of laminated plastic sheets.

The chlorine content of the chlorinated polymers according to this invention can be determined by burning a sample of the chlorinated polymer in a quartz tube in a stream of air and completing the burning by replacing the air stream with a stream of oxygen. The total gas produced by the burning is passed through an absorption tube containing a sodium carbonate solution. The chloride ion in the resulting absorption mixture is determined by titrating according to the Volhard method. The chlorine content of the chlorinated polymer at any stage of the chlorination reaction can be determined by withdrawing a sample of the reaction mixture, volatilizing the solvent therefrom, and determining the chlorine content of the residue as described hereinbefore.

The crystallinity of the polyethylene can be determined according to the method of Matthews, Peiser, and Richards, Acta Crystallographica 2, 85 (1949).

From the foregoing, it will be seen that I have provided a composition having unexpected properties, said composition comprising a chlorinated polyethylene containing from about 17 to about 33 weight percent chemically combined chlorine and having been produced from a polyethylene having a molecular weight of at least 30,000. I have also described suitable methods for preparing such compositions.

While certain compositions, examples and process steps have been described for purposes of illustration, it will be clear to those skilled in the art that the invention is not limited thereto.

I claim:

1. A chlorinated polyethylene containing from about 17 to about 33 weight percent chemically combined chlorine and produced from a polyethylene having a molecular weight of at least 30,000 and a density of at least 0.94 gram per cubic centimeter at 20° C.

2. A chlorinated polyethylene containing from about 20 to about 30 weight percent chemically combined chlorine and produced from a polyethylene having a molecular weight in the range 30,000 to 200,000, a density of at least 0.94 gram per cubic centimeter at 20° C. and a crystallinity of at least 80 percent.

3. A chlorinated polyethylene containing from about 20 to about 30 weight percent chemically combined chlorine and having a tensile strength of at least 1500 p.s.i., the polyethylene, prior to chlorination, having a density of at least 0.95 gram per cubic centimeter at 20° C., a crystallinity of at least 90 percent, and a molecular weight in the range 30,000 to 200,000.

4. A filament of cold drawn chlorinated polyethylene according to claim 3.

5. A chlorinated polyethylene containing from about 17 to about 33 weight percent chemically combined chlorine, the polyethylene, prior to chlorination, having a density of at least 0.94 at 20° C. and a molecular weight from about 30,000 to about 200,000.

6. A chlorinated polyethylene containing from about 20 to about 30 weight percent chemically combined chlorine, the polyethylene, prior to chlorination, having a molecular weight in the range 30,000 to 200,000 and a density of at least 0.94 gram per cubic centimeter at 20° C.

7. A chlorinated polyethylene containing from about 20 to about 30 weight percent chemically combined chlorine and having a tensile strength in the range 1500 to 4000 p.s.i., the polyethylene, prior to chlorination, having a molecular weight in the range 30,000 to 200,000 and a density of at least 0.94 gram per cubic centimeter at 20° C.

8. A chlorinated polyethylene containing from about 20 to about 30 weight percent chemically combined chlorine and having a tensile strength in the range 1500 to 4000 p.s.i., the polyethylene, prior to chlorination, having a density of at least 0.95 gram per cubic centimeter at 20° C., a crystallinity of at least 90 percent, and a molecular weight in the range 30,000 to 200,000.

9. An improved chlorinated polyethylene containing from about 17 to about 33 weight percent chemically combined chlorine, which has been prepared from a polyethylene having an essentially linear and unbranched molecular structure and which contains less than about 3 methyl groups per each 100 methylene groups in the polymer molecule and having a molecular weight of at least 40,000.

10. A process which comprises chlorinating a polyethylene having a molecular weight of at least 30,000, a density of at least 0.94 gram per cubic centimeter at 20° C. and a crystallinity of at least 80 percent, the polyethylene being maintained in solution in a solvent during the chlorination, continuing the chlorination until the chemically combined chlorine content of the chlorinated polyethylene is within the range 17 to 33 weight percent, and recovering said chlorinated polyethylene.

11. A process which comprises chlorinating a polyethylene having a molecular weight in the range 30,000 to 200,000, a density of at least 0.94 gram per cubic centimeter at 20° C. and a crystallinity of at least 80 percent, the chlorination being effected in solution in a solvent selected from the group consisting of carbon tetrachloride and 1,1,2,2-tetrachloroethane, continuing the chlorination until the chemically combined chlorine content of the chlorinated polyethylene is within the range 17 to 33 weight percent, and recovering said chlorinated polyethylene.

References Cited in the file of this patent

UNITED STATES PATENTS

| | | |
|---|---|---|
| 2,422,919 | Myles et al. | June 24, 1947 |
| 2,481,188 | Babayan | Sept. 6, 1949 |

FOREIGN PATENTS

| | | |
|---|---|---|
| 533,362 | Belgium | Nov. 16, 1954 |